(12) United States Patent
Jolivet

(10) Patent No.: US 8,544,744 B2
(45) Date of Patent: Oct. 1, 2013

(54) METHOD FOR A MORE EFFICIENT USE OF AN INTERFACE BETWEEN A SMART CARD AND A DEVICE, ASSOCIATED SMART CARD AND DEVICE

(75) Inventor: Paul Jolivet, Juvisy sur Orge (FR)

(73) Assignee: LG Electronics Inc., Seoul (KR)

( * ) Notice: Subject to any disclaimer, the term of this patent is extended or adjusted under 35 U.S.C. 154(b) by 1598 days.

(21) Appl. No.: 11/614,245

(22) Filed: Dec. 21, 2006

(65) Prior Publication Data

US 2007/0145133 A1    Jun. 28, 2007

(30) Foreign Application Priority Data

Dec. 22, 2005  (EP) ..................................... 05292770

(51) Int. Cl.
*G06K 19/00*    (2006.01)
(52) U.S. Cl.
USPC ........................... 235/446; 235/487; 235/492
(58) Field of Classification Search
USPC ................. 235/435, 439, 444–446, 487, 492
See application file for complete search history.

(56) References Cited

U.S. PATENT DOCUMENTS

| | | | |
|---|---|---|---|
| 6,883,715 B1* | 4/2005 | Fruhauf et al. ................. | 235/492 |
| 2002/0013884 A1* | 1/2002 | Fujioka .......................... | 711/115 |
| 2003/0115371 A1* | 6/2003 | Kang et al. ..................... | 709/310 |
| 2004/0129787 A1* | 7/2004 | Saito et al. ..................... | 235/492 |
| 2004/0178278 A1 | 9/2004 | Fruhauf et al. | |
| 2004/0249625 A1* | 12/2004 | Leaming ......................... | 703/27 |
| 2005/0005045 A1 | 1/2005 | Kim et al. | |
| 2005/0086434 A1* | 4/2005 | Kang et al. ..................... | 711/115 |
| 2005/0224588 A1* | 10/2005 | Ruping et al. ................. | 235/492 |
| 2005/0252978 A1* | 11/2005 | Nishizawa et al. ........... | 235/492 |

FOREIGN PATENT DOCUMENTS

| | | |
|---|---|---|
| NL | 9301540 | 4/1995 |
| WO | WO 9949415 A2 * | 9/1999 |

OTHER PUBLICATIONS

Rankl, Wolfgang; Effing Wolfgang: "Handuch der Chipkarten" 2002, Hanser Verlag, Munchen, Wien, XP002379548 *p. 377-p. 402*.

* cited by examiner

*Primary Examiner* — Michael G Lee
*Assistant Examiner* — Matthew Mikels
(74) *Attorney, Agent, or Firm* — Lee, Hong, Degerman, Kang & Waimey

(57) ABSTRACT

The invention relates to a method for a more efficient use of an interface between a smart card and a device, the interface comprising contacts and being adapted to allow data transfer between the smart card and the device characterized in that it comprises a step of allocating functions to the contacts within the interface so as to have a more efficient use of the contacts in the interface. The invention also relates to a smart card and a device in which the method is carried out.

19 Claims, 5 Drawing Sheets

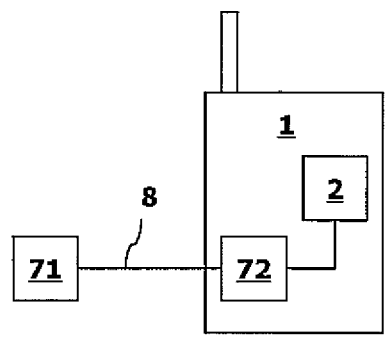
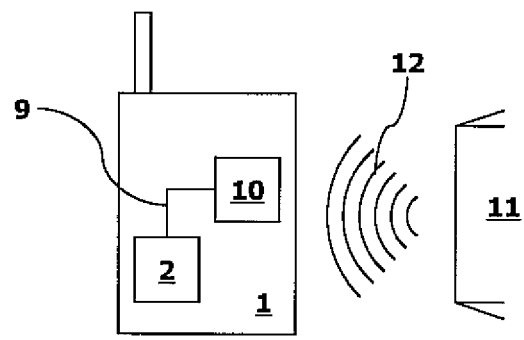
FIG. 3a  FIG. 3b
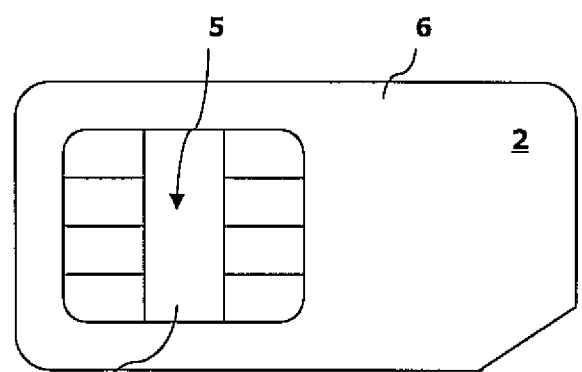
FIG. 4a
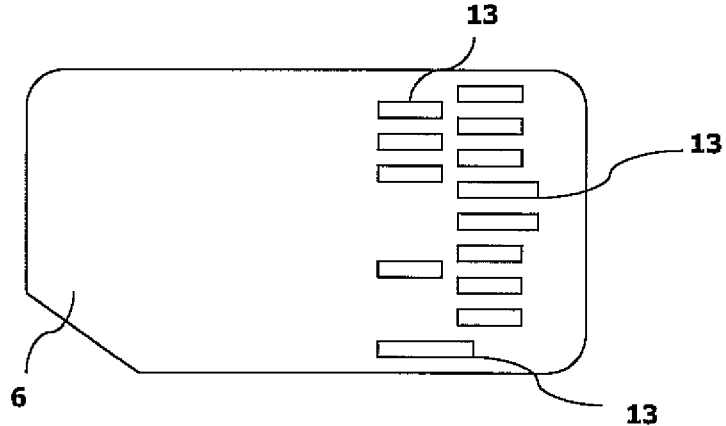
FIG. 4b

METHOD FOR A MORE EFFICIENT USE OF AN INTERFACE BETWEEN A SMART CARD AND A DEVICE, ASSOCIATED SMART CARD AND DEVICE

CROSS-REFERENCE TO RELATED APPLICATION

Pursuant to 35 U.S.C. §119(a), this application claims the benefit of earlier filing date and right of priority to European Patent Application No. 05292770.4, filed on Dec. 22, 2005, the contents of which are hereby incorporated by reference herein in their entirety.

FIELD OF THE INVENTION

The present invention relates to a method for a more efficient use of an interface between a smart card and a device, the interface comprising contacts and being adapted to allow data transfer between the smart card and the device.

The invention also relates to a smart card and a device in which the method is carried out.

BACKGROUND OF THE INVENTION

FIG. 1 is a schematic representation of a known interface 3 between a smart card 2 and a device 1.

In the present specification, the device 1 is preferably a telecommunication terminal, such as a mobile handset, but also can be any device, such as a personal computer.

Similarly, the smart card 2 is preferably a UICC ("UMTS Integrated Circuit Card", UMTS meaning "Universal Mobile Telecommunication System"), but could be of any type of smart card, such as a SD card ("Secure Device" card) or a MMC card ("MultiMedia Communications" card) for instance.

The interface 3 allows data transfers between the smart card 2 and the device 1 and power supply to the smart card 2.

More specifically, the UICC bears a SIM ("Subscriber Identity Module") for an account of a user of the smart card 2 according to the GSM ("Global System for Mobile communications") protocol. The UICC also bears at least a USIM ("Universal SIM") for at least an account of a user according to the UMTS protocol. UICC is currently based on ISO ("International Organization for Standardization") standard extended by ETSI ("European Telecommunications Standard Institute") and 3GPP ("Third Generation Partnership Project") specifications.

The following documents can be consulted to know what the specifications of the protocols carried out in the UICC card are: ISO 7816-3, ETSI SCP TS 102 221 and 3GPP TS 31.101 for instance. ISO/ETSI also define the voltage and power available for the different UICC cards. In some specific cases, other specification apply such as TS 102 221 for UICC (used by 3GPP and 3GPP2 for telecommunication smart cards).

FIG. 2 shows that the smart card 2 comprises a card 6 in which a chip 5, comprising pins, is embedded. The pins of the chip 5 are connected to a stamp 4 on the surface of the card 6. The stamp 4 comprises conventionally eight contacts, referred to as C1 to C8. The format of the card of FIG. 2 is ID-000 UICC, but can be of any format, such as ID-1 UICC or Mini UICC format.

The interface 3 of FIG. 1 comprises on the side of the device a smart card reader, and on the side of the smart card comprises the contacts C1 to C8.

The contacts C1 to C8 have a function within the interface 3 with respect to data transfer protocols between the smart card 2 and the device 1 and/or power supply to the smart card 2.

Table 1 shows an example of the different functions of the contacts in the interface 3 for ISO 7816-2 specifications.

TABLE 1

| ISO contact allocation | |
|---|---|
| # | Assignment |
| C1 | Vcc |
| C2 | RST |
| C3 | CLK |
| C4 | Future use |
| C5 | GND |
| C6 | Vpp (not used) |
| C7 | I/O |
| C8 | Future use |

In Table 1, Vcc is the terminal for the power supply (power input), GND is the ground terminal, RST is a reset signal terminal, Vpp is the Voltage programming power terminal (not used currently), CLK is the clock signal terminal, I/O is the Input/Output data terminal and C4 and C8 are left for future use.

There are therefore three contacts, namely C4, C6 and C8, which are not currently used. The three remaining contacts C4, C6 and C8 could be used for other applications and/or protocols for instance.

FIGS. 3a and 3b show that two main extra applications are currently desired on top of the applications already run in the device 1 and the smart card 2.

FIG. 3a shows that the first main desired application is the rapid transfer of data between the smart card 2 and the device 1. This need is due to the fact that files of bigger and bigger sizes coming from the device 1 must be managed by the smart card 2.

For instance, a module 72 of the device 1 can transfer big files to the smart card 2. Big files can be transmitted from a peripheral 71 for instance to the smart card 2 via the module 72, an interface 8 being thus established between the peripheral 71 and the module 72.

The peripheral 71 can be a digital camera for instance, or another peripheral device. In FIG. 3a, the peripheral 71 is represented outside the terminal 1, but could be positioned inside the device 1 as well.

FIG. 3b shows that the second main desired application is the transfer of data between a radio module 10 of the device 1 and the smart card 2. There is a data transfer between the radio module 10 and a post 11 via a magnetic field 12. The radio module 10 sends then the data to the smart card 2. The contactless data transfer between the post 11 and the smart card 2 is typically used for payment and/or identification applications.

These two applications are only examples, and other applications can also be desired on top of the applications already run in the device 1 and the smart card 2.

The current smart card 2 and device 1 have drawbacks for the running of the desired applications/protocols.

The ISO protocols and I/O terminal currently used in the prior art are limiting the interface data transfer speed (from 1.2 kBytes/s up to 50 kB/s). The transfer of data between the module 72 and the smart card 2 is too long for big files, coming from a high resolution digital camera for instance.

The rapid transfer can be done using MMC ("MultiMedia Communications") and/or USB ("Universal Serial Bus") protocols, allowing up to roughly 50 MB/s data transfer speeds. Full implementations of the MMC and USB protocols need more than two contacts to be implemented on the smart card 2. The MMC solution offers for instance a high transfer speed using four contacts. The configuration with four contacts is preferred to a solution with only two contacts, which provides limited bandwidth.

Furthermore, the contactless transfer application needs also at least two contacts to be implemented efficiently on the smart card.

One easily understands that if a rapid transfer protocol and a contactless application must be implemented on the smart card altogether, it is not possible to implement it on a smart card according to FIG. 2.

A possible solution to this problem is shown in FIGS. 4a, 4b, 5 and 6.

FIGS. 4a, 4b, 5 and 6 are schematic representations of known smart cards 2, comprising extra contacts 13 compared to the smart card of FIG. 2. The extra contacts 13 could be used to implement the desired applications and/or protocols on the smart card 2.

FIGS. 4a and 4b show that the extra contacts 13 are positioned at the back of the card 6. FIG. 5 shows that the extra contacts 13 are positioned at the front of the card 6, on the same side as the stamp 4. FIG. 6 shows that the extra contacts 13 are positioned in the central part of the stamp 4. The UICC cards of FIGS. 4a, 4b and 5 are ID-000 formats, and the UICC of FIG. 6 is Mini UICC format.

However, the size of the card is limited. Extra contacts 13 cannot be added each time an extra application and/or protocol must be implemented on a smart card.

Furthermore, the smart cards 2 of FIGS. 4a, 4b, 5 and 6 are not standard cards, and the formats with more contacts 13 as shown in FIGS. 4a, 4b, 5 and 6 are unlikely to be accepted as a new standards.

SUMMARY OF THE INVENTION

It is an object of the invention to mitigate at least one of the drawbacks of the prior art.

To do so, it is proposed according to the invention a method for a more efficient use of an interface between a smart card and a device.

The invention allows an implementation of an interface between a smart card and a device, the interface allowing the running of desired applications and/or protocols using the currently used standard smart cards.

For instance, files of big sizes—coming from a digital camera for instance—can be exchanged between the smart card and the device. Contactless date transfer can be also implemented.

No extra contacts need to be put on the smart card, and if some contacts have to be added, there is as little duplication as possible with respect to the standard smart card.

In one embodiment, the invention allows dynamically allocating different functions to contacts, depending on the used application and/or upon card or terminal request. The invention offers the possibility to reallocate the functions of the contacts at any time during a smart card session, and reinitiate the smart card session with another interface configuration and protocol. A contact negotiation phase for instance is enhanced.

In another embodiment, the invention allows reusing some contacts of the standard physical interface for the use of other interface configurations, minimizing duplication of common-function contacts.

BRIEF DESCRIPTION OF THE DRAWINGS

Other aspects, objects and advantages of the invention will be better apparent on reading the following description of the invention, made with reference to the accompanying drawings, in which:

FIGS. 3a and 3b are schematic representations of known applications and/or protocols which are desired to be implemented to a device.

FIGS. 4a, 4b, 5 and 6 are schematic representations of known smart cards, comprising extra contacts compared to the smart card of FIG. 2.

In all the figures, similar elements are referred to with identical numerical references.

DESCRIPTION OF PREFERRED EMBODIMENTS

Figure 1:
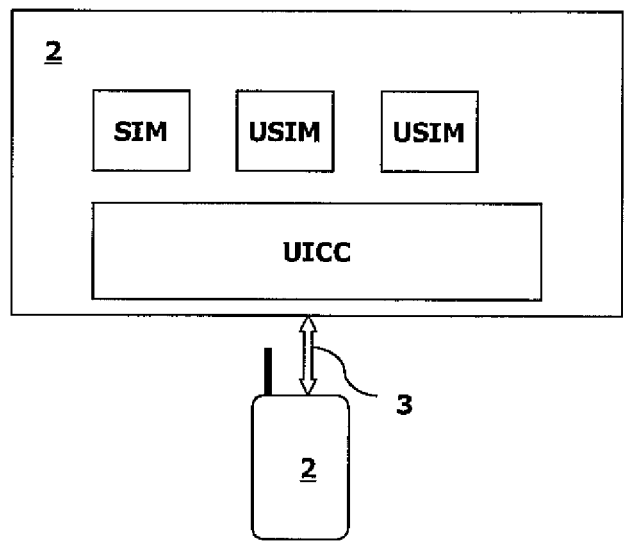
FIG. 1 is a schematic representation of a known interface between a smart card and a device.
Figure 2:
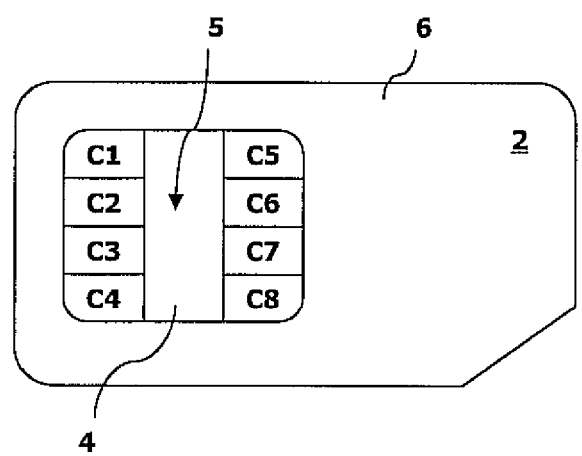
FIG. 2 is a schematic representation of a known smart card.
Figure 5:
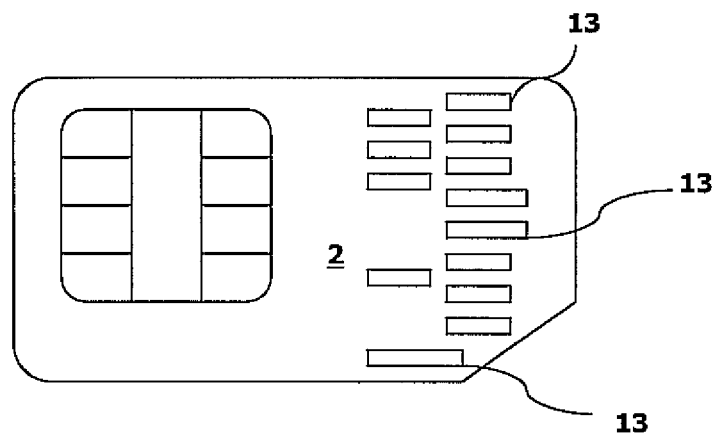
Figure 6:
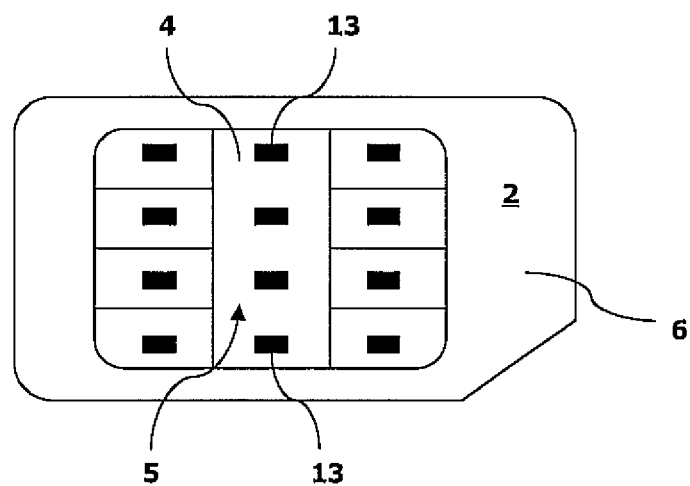
Figure 7:
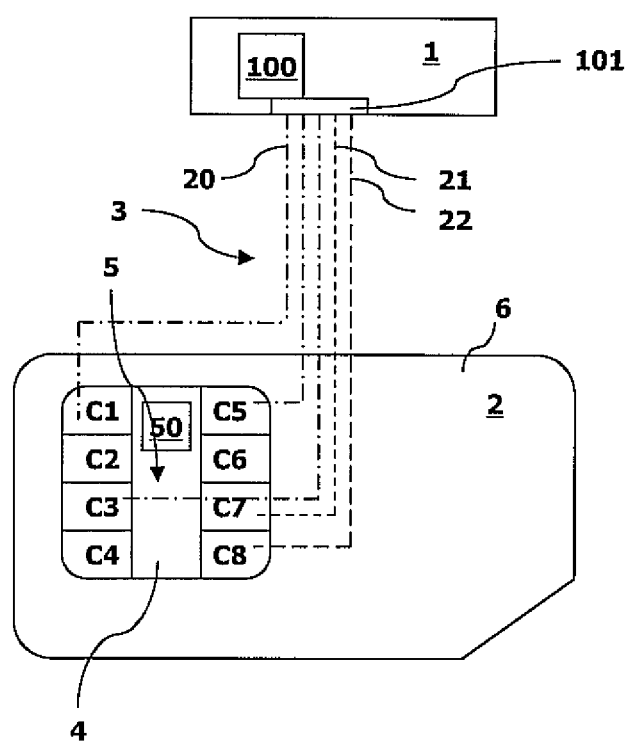
FIG. 7 is a schematic representation of a way to allocate functions to the contacts of a smart card in an interface between two data transfer protocols.
Figure 8:
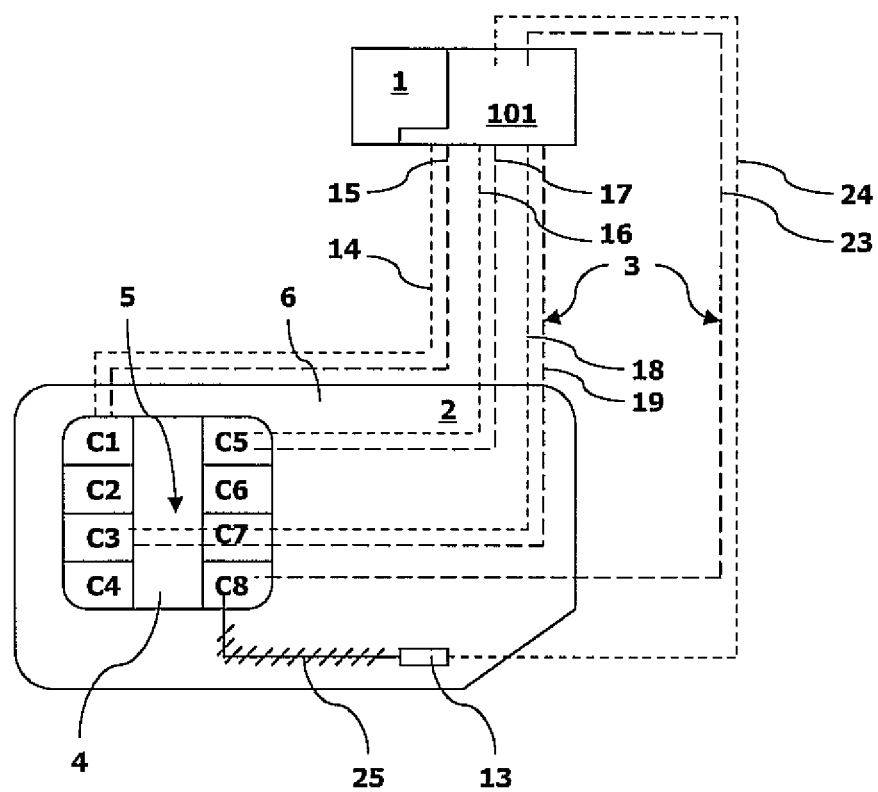
FIG. 8 is a schematic representation of another way to allocate functions to the contacts of a smart card in an interface between two data transfer protocols.

FIGS. 7 and 8 are schematic representations of a method for a more efficient use of an interface 3 between a smart card 2 and a device 1, according to the invention.

On the side of the smart card 2, the interface 3 comprises contacts C1-C8 on a stamp 4 and/or 13 on a card 6. The contacts C1-C8 and/or 13 adapted to allow data transfer between the smart card 2 and the device 1.

On the side of the device 1, the interface 3 comprises a smart card reader 101 arranged to cooperate with the contacts C1-C8 and/or 13 of the smart card 2.

The method according to the invention comprises a step of allocating functions to the contacts C1-C8 and/or 13 within the interface 3 so as to have a more efficient use of the contacts in the interface 3.

To this end, the smart card 2 and/or the device 1 comprise allocation means 14-17, 50, 20-22 and/or 100 for allocating functions to the contacts C1-C8 and/or 13 within the interface 3.

Two main embodiments can be described.

First Embodiment

In a first embodiment, the allocation of the functions of the contacts C1-C8 is dynamic.

As already said, it is desired to have a more efficient use the contacts of the physical interface 3, in order for instance to raise the data transfer speed or add the implementation of an extra application and/or protocol.

To allow the implementation of multiple interface configurations without changing the current physical interface, FIG. 7 shows that the allocation of the functions of the contacts C1-C8 is done and changed dynamically.

In the first embodiment, the eight existing ISO contacts C1-C8 are allocated and reallocated dynamically within the interface 3 of the smart card 2, depending on the interface configuration which is needed for the use of a protocol, such as MMC, USB, contactless transfer application or any other protocol.

To this end, the device 1 comprises dynamic allocation means 100 and/or the smart card 2 comprises dynamic allocation means 50.

An exchange protocol run in the dynamic allocation means 50 and/or 100 gives the possibility to negotiate dynamically, at any time, in the one hand the functions allocated to the contacts and in the other hand the data transfer protocol to be used between the device 1 and the smart card 2.

The implementations of the applications in the device-smart card assembly are based on the analysis of the ATR ("Answer To Reset") message by the device 1, at the smart card 2 session opening. The ATR gives information about the features supported by the smart card 2 and/or the device 1. Based on this information, the smart card 2 session is opened and data transfer can be initiated.

The dynamic allocation can be performed by the dynamic means 50 and/or 100 via an enhancement of the answer to reset (ATR) message, with a feature corresponding to the allocation. The allocation of different functions to the contacts is therefore presented as an extra available service.

The dynamic allocation can also be performed by the dynamic means 50 and/or 100 via an enhancement of a protocol and parameter selection (PPS) negotiation phase with a contact negotiation phase. The prior art contact negotiation phase is enhanced. This phase would be preferably done at the initial session opening of the smart card 2.

The dynamic allocation can also be performed by the dynamic means 50 and/or 100 via a creation of an extra command in the device and/or the smart card 2. Preferably, the command is standard and/or protocol specific and/or proprietary for the device 1. In the case where the command is protocol specific, it can be 3GPP specific for instance.

The dynamic allocation can also be performed by the dynamic means 50 and/or 100 via a switch of the smart card 2 between pre-defined interface configurations, each configuration being a set of protocol information and contact allocation.

The invention offers the possibility to reallocate the functions of the contacts at any time during a smart card session, and reinitiate the smart card session with another interface configuration and protocol.

FIG. 7 shows that thanks to the reallocation of the functions of the contacts, the contact C7 can be used as the I/O terminal in a given protocol via a link 21 with the card reader 101 in the interface 3, and the contact C8 used as the I/O in another protocol via a link 22 with the card reader 101.

The other terminals for the protocols can also be dynamically reallocated between two protocols.

The card reader 101 is preferably able to access the eight contacts C1-C8 at the front and also able to access the back of the smart card 2. The pins of the chip 5 are connected to the eight contacts C1-C8 too.

FIG. 7 shows that, preferably, a clock signal terminal is always allocated to the contact C3, and/or a Vcc terminal of a power supply is always allocated to the contact C1, and/or a ground terminal is always allocated to the contact C5 via links 20 with the card reader 101 in the interface 3.

This is due to security reasons as well as to simplification of the implementation of the interface configurations in the smart card 2.

Many different configurations of interface can be implemented, using only the eight contacts available on all the formats of standard smart cards, including the front and back smart cards.

Second Embodiment

In a second embodiment, the allocation of the functions of the contacts C1-C8 or 13 is static. The static allocation is based on the use of a common contact for a common function in several protocols of data transfer through the interface 3. Some contacts are shared between different protocols and interfaces configurations.

As already said, it is desired to have a more efficient use of the contacts of the physical interface 3, in order for instance to raise the transfer speed or add the implementation of an extra application and/or protocol.

To allow the implementation of multiple interfaces configurations without changing too much the current physical interface, FIG. 8 shows that the allocation of the functions of the contacts C1-C8 is static. The principle is to reuse some of the ISO contacts in different interface configurations, whether the interface configuration is a MMC or any other.

In the second embodiment, the eight existing ISO contacts C1-C8 are allocated functions within the interface 3 of the smart card 2 to minimize duplication of common-function contacts.

To this end, a clock signal terminal is allocated to the contact C3 via links 18 and 19 with the card reader 101 for two interface configurations for instance, and/or a Vcc terminal of a power supply is allocated to the contact C1 via links 14 and 15 with the card reader 101 for the two interface configurations, and/or a ground terminal is allocated to the contact C5 via links 16 and 17 with the card reader 101 for the two interface configurations.

This is due to security reasons as well as to simplification of the implementation of the interface configurations on the smart card 2.

On top of that, this basically implies that the interface configuration using links 14, 16 and 18 and the interface configuration using links 15, 17, and 19 have both either common specification, such as current level for instance, or characteristics which can be derived the one from the other, such as the clock frequency, which can easily be divided or multiplied in the smart card 2.

Of course, the format of FIG. 8 is only an example. Different formats of smart card exist and different contact layouts can be used.

The card reader 101 of the device should preferably be able to access the eight contacts C1-C8 and even extra contacts such as 13 at the front of the smart card 2, and also able to access the back of the smart card 2. The extra contacts 13 are optional.

The addition of extra contacts 13 is an opportunity to implement more applications and protocols in the smart card 2, with as many extra contacts 13 as possible. FIG. 8 shows that there can be an interface configuration using a link 23 between the card reader 101 and C8, and an interface configuration using a link 24 between the card reader 101 and the extra contact 13 for different or similar functions.

However, it is always good to have a more efficient use of the extra contacts 13, to avoid duplication of contacts when some contacts can be shared by several interface configurations. Therefore, link 24 for instance can be directed to C8 if the functions of C8 and 13 are the same in both protocols and interface configurations, or a physical link 25 can bound the contacts C8 and 13.

The pins of the chips are connected to the eight contacts C1-C8 and optional extra contacts 13 too.

The second embodiment allows freeing some contacts for other or future use, while avoiding duplicated use of contacts with the same characteristics or functions.

The invention is independent on the smart card format, although it is of course all the more interesting that the format is small, because the size of the card is limited.

The invention claimed is:

1. A method for operating an interface between a smart card and a device, the interface comprising a plurality of contacts and being adapted to facilitate data transfer between the smart card and the device, the method comprising:
   transferring an answer to reset (ATR) message from the smart card to the device; and
   dynamically allocating functions of the plurality of contacts based on information provided by the ATR message,
   wherein dynamically allocating the functions of the plurality of contacts comprises allocating an unused contact of the plurality of contacts as an input/output data terminal for facilitating the data transfer between the smart card and the device, and
   wherein dynamically allocating the functions of the plurality of contacts is further based on a switch of the smart card between pre-defined configurations, each of the pre-defined configurations having corresponding protocol information and contact allocation, and is further based on a command issued by the smart card.

2. A method according to claim 1, wherein the information provided by the ATR message comprises enhanced information regarding the allocation of the functions.

3. A method according to claim 1, wherein dynamically allocating the functions of the plurality of contacts is further based on an enhancement of a protocol and parameter selection (PPS) negotiation phase with a contact negotiation phase.

4. A method according to claim 1, wherein dynamically allocating the functions of the plurality of contacts is further based on a command issued by the device.

5. A method according to claim 4, wherein the command issued by the device is at least standard, protocol specific or proprietary for the device.

6. A method according to claim 1, wherein the allocating of the functions of the contacts is static and is based on the use of a common contact for a common function in several protocols of data transfer through the interface.

7. A method according to the claim 1, wherein the allocating is performed via physically linking contacts which are used as a common contact by a physical link.

8. A method according to claim 1, wherein a clock signal terminal, and/or a Vcc terminal of a power supply, and/or a ground terminal of all the protocols are respectively allocated to a common contact.

9. A smart card comprising an interface, the interface comprising a plurality of contacts arranged to cooperate with a device and adapted to facilitate data transfer between the smart card and the device, wherein the interface further comprises:
   means for transferring an answer to reset (ATR) message from the smart card to the device; and
   means for dynamically allocating functions to the plurality of contacts based on information provided by the ATR message,
   wherein the means for dynamically allocating the functions to the plurality of contacts is configured to allocate an unused contact of the plurality of contacts as an input/output data terminal for facilitating the data transfer between the smart card and the device, and
   wherein the means for dynamically allocating is further configured to allocate the functions based on a switch of the smart card between pre-defined configurations, each of the pre-defined configurations having corresponding protocol information and contact allocation, and is further configured to allocate the functions based on a command issued by the smart card.

10. A smart card according to claim 9, wherein the information provided by the ATR message comprises enhanced information regarding the allocation of the functions.

11. A smart card according to claim 9, wherein the means for dynamically allocating is further configured to allocate the functions based on an enhancement of a protocol and parameter selection (PPS) negotiation phase with a contact negotiation phase.

12. A smart card according to claim 9, wherein the means for dynamically allocating is further configured to allocate the functions based on a command issued by the device.

13. A smart card according to claim 12, wherein the command issued by the device is at least standard, protocol specific or proprietary for the device.

14. A smart card according to claim 9, wherein the allocation means are physical common links between common contacts.

15. A device comprising an interface adapted to facilitate data transfer between a smart card and the device, the interface comprising:
   a smart card reader arranged to cooperate with the smart card;
   means for transferring an answer to reset (ATR) message from the smart card to the device; and
   means for dynamically allocating functions to a plurality of contacts of the smart card based on information provided by the ATR message,
   wherein the means for dynamically allocating the functions to the plurality of contacts is configured to allocate an unused contact of the plurality of contacts as an input/output data terminal for facilitating the data transfer between the smart card and the device, and
   wherein the means for dynamically allocating is further configured to allocate the functions based on a switch of the smart card between pre-defined configurations, each of the pre-defined configurations having corresponding protocol information and contact allocation, and is further configured to allocate the functions based on a command issued by the smart card.

16. A device according to claim 15, wherein the information provided by the ATR message comprises enhanced information regarding the allocation of the functions.

17. A device according to claim 15, wherein the means for dynamically allocating is further configured to allocate the functions based on an enhancement of a protocol and parameter selection (PPS) negotiation phase with a contact negotiation phase.

18. A device according to claim 15, wherein the means for dynamically allocating is further configured to allocate the functions based on a command issued by at the device.

19. A device according to claim 18, wherein the command issued by the device is at least standard, protocol specific or proprietary for the device.

* * * * *